(12) United States Patent

Dimou et al.

(10) Patent No.: US 12,603,756 B2

(45) Date of Patent: Apr. 14, 2026

(54) FULLY HOMOMORPHIC ENCRYPTED PROCESSING ACCELERATION

(71) Applicant: Niobium Microsystems, Inc., Dayton, OH (US)

(72) Inventors: Georgios Dimou, San Diego, CA (US); David W. Archer, Sherwood, CA (US); Brian Huffman, Leuven, CA (US); Tynan McAuley, Portland Portland, CA (US); Michiel Van Beirendonck, San Francisco (BE)

(73) Assignee: Niobium Microsystems, Inc., Dayton, OH (US)

( * ) Notice: Subject to any disclaimer, the term of this patent is extended or adjusted under 35 U.S.C. 154(b) by 0 days.

(21) Appl. No.: 18/674,853

(22) Filed: May 25, 2024

(65) Prior Publication Data

US 2024/0396705 A1 Nov. 28, 2024

Related U.S. Application Data

(60) Provisional application No. 63/504,629, filed on May 26, 2023.

(51) Int. Cl.
| | |
|---|---|
| *H04L 9/00* | (2022.01) |
| *H04L 9/08* | (2006.01) |
| *H04L 29/06* | (2006.01) |

(52) U.S. Cl.
CPC ............ *H04L 9/008* (2013.01); *H04L 9/0869* (2013.01)

(58) Field of Classification Search
CPC ..... H04L 9/008; H04L 9/0869; H04L 9/0618; H04L 9/0656; H04L 9/0662; H04L 9/0668; H04L 9/08; H04L 9/0861
See application file for complete search history.

(56) References Cited

U.S. PATENT DOCUMENTS

| | | | |
|---|---|---|---|
| 10,817,262 B2 | 10/2020 | Carr et al. | |
| 11,914,757 B2 | 2/2024 | Rao | |
| 12,200,101 B2 | 1/2025 | Agrawal et al. | |
| 12,316,736 B2 | 5/2025 | Moon et al. | |
| 12,380,225 B2 | 8/2025 | Moon et al. | |
| 12,489,603 B2 | 12/2025 | Ren et al. | |
| 2007/0294494 A1 | 12/2007 | Conti et al. | |
| 2015/0372812 A1* | 12/2015 | Parann-Nissany | ...... H04L 63/06 |
| | | | 380/44 |

(Continued)

FOREIGN PATENT DOCUMENTS

WO 2018147497 A1 8/2018

*Primary Examiner* — Edward Zee

(74) *Attorney, Agent, or Firm* — Jeffrey Schox; Samuel Rosenthal

(57) ABSTRACT

A method for reducing calculation time for processing fully homomorphic encrypted (FHE) data comprises pre-calculating a second half of a key-switching key, storing the second half of the key-switching key in memory, and receiving FHE data. After the FHE data is received, the method determines a first half of the key-switching key by randomly generating a first half of the key-switching key. The key-switching key is then constructed by retrieving the second half of the key-switching key from the memory and appending the second half of the key-switching key to the first half of the key-switching key. After the key has been constructed, a key-switching operation is performed on the FHE data using the key-switching key.

8 Claims, 8 Drawing Sheets

(56)　　　　　　References Cited

U.S. PATENT DOCUMENTS

| | | |
|---|---|---|
| 2016/0277528 A1 | 9/2016 | Guilaume et al. |
| 2017/0346622 A1 | 11/2017 | Howard |
| 2018/0294950 A1 | 10/2018 | Khedr et al. |
| 2021/0216283 A1 | 7/2021 | Hiscock |
| 2021/0266168 A1 | 8/2021 | Ng et al. |
| 2021/0399874 A1* | 12/2021 | Polyakov ................ H04L 9/085 |
| 2022/0014351 A1 | 1/2022 | Jung et al. |
| 2022/0188072 A1 | 6/2022 | Langhammer et al. |
| 2022/0368514 A1 | 11/2022 | Fei et al. |
| 2022/0413909 A1 | 12/2022 | Kakaiya et al. |
| 2023/0014392 A1 | 1/2023 | Asharov et al. |
| 2023/0027423 A1 | 1/2023 | Rao |
| 2023/0132500 A1 | 5/2023 | Sinha Roy et al. |
| 2023/0136291 A1 | 5/2023 | Boemer et al. |
| 2023/0140257 A1 | 5/2023 | Boemer et al. |
| 2023/0291541 A1 | 9/2023 | Gupta et al. |
| 2023/0297371 A1 | 9/2023 | Boemer et al. |
| 2023/0396409 A1 | 12/2023 | Joye |
| 2024/0048352 A1 | 2/2024 | Ren et al. |
| 2024/0171371 A1 | 5/2024 | Bottleson et al. |

* cited by examiner

FIG. 5

FULLY HOMOMORPHIC ENCRYPTED PROCESSING ACCELERATION

CROSS REFERENCE TO RELATED APPLICATIONS

This application claims the benefit of U.S. Provisional Patent Application Ser. No. 63/504,629, filed May 26, 2023 "FULLY HOMOMORPHIC ENCRYPTED PROCESSING ACCELERATION", the disclosure of which is hereby incorporated by reference.

BACKGROUND

Various aspects of the present invention relate generally to homomorphic encryption and more specifically to hardware accelerators for processing fully homomorphically encrypted data.

Fully Homomorphic Encryption (FHE) provides a simple use model to securely outsource computation on sensitive data to a third party. Basically, an FHE system can process encrypted data without a requirement to unencrypt the data. Therefore, third parties may be able to process sensitive data.

BRIEF SUMMARY

According to aspects of the present disclosure, a method for reducing calculation time for processing fully homomorphic encrypted (FHE) data comprises pre-calculating a second half of a key-switching key, storing the second half of the key-switching key in memory, and receiving FHE data. After the FHE data is received, the method determines a first half of the key-switching key by randomly generating a first half of the key-switching key. The key-switching key is then constructed by retrieving the second half of the key-switching key from the memory and appending the second half of the key-switching key to the first half of the key-switching key. After the key has been constructed, a key-switching operation is performed on the FHE data using the key-switching key.

In some embodiments, instead of the second half of a key-switching key being pre-calculated, the second half of a key-switching key is generated based on the first half of a key-switching key.

BRIEF DESCRIPTION OF THE SEVERAL VIEWS OF THE DRAWINGS

FIG. 5 is a block diagram illustrating a size-four permutation processing elements (PE), according to various aspects of the present disclosure;

DETAILED DESCRIPTION

Figure 1:
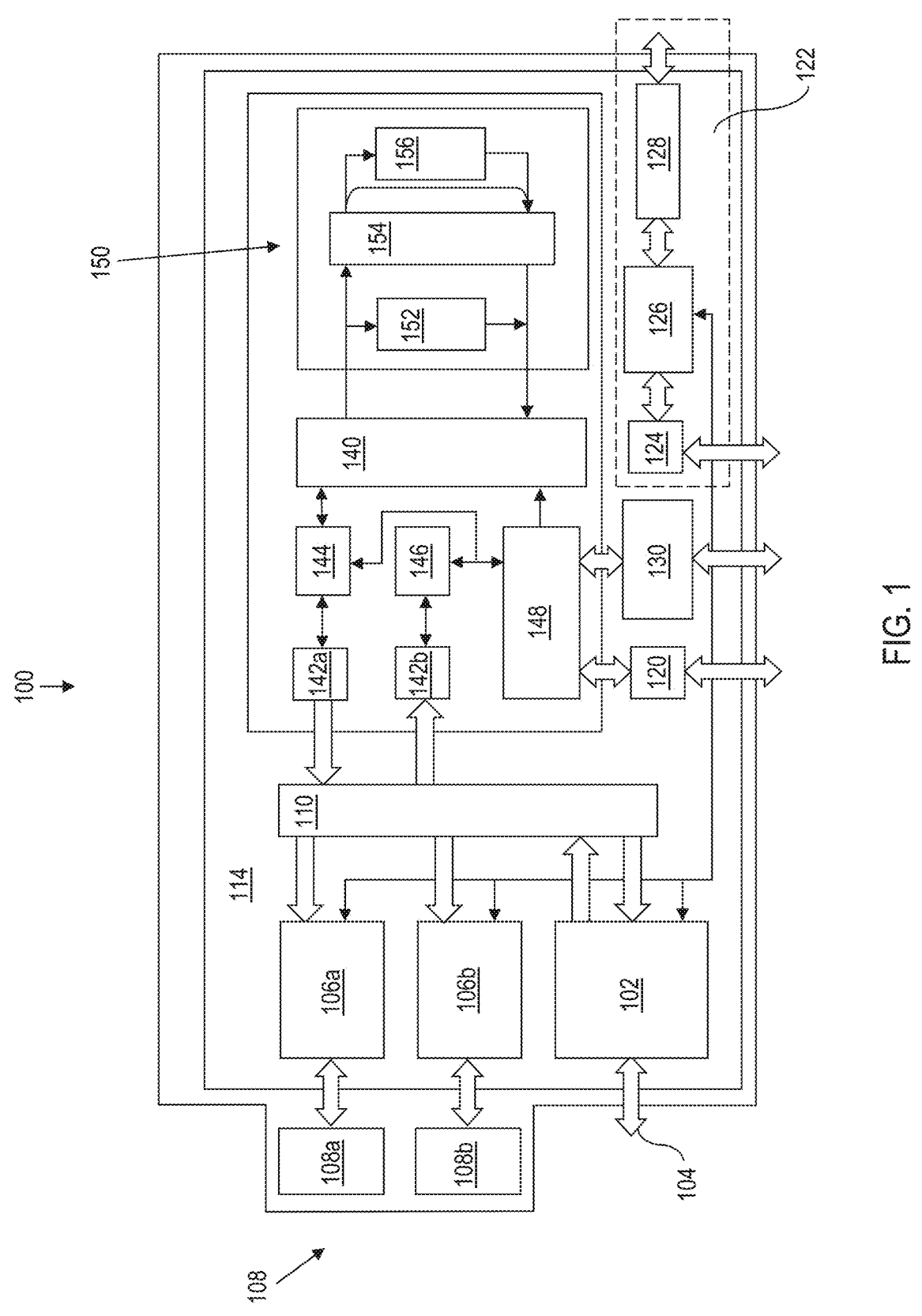
FIG. 1 is block diagram illustrating a device (a board) for processing fully homomorphic encrypted (FHE) data using a dedicated FHE accelerator, according to various aspects of the present disclosure.

Fully Homomorphic Encryption (FHE) provides a simple use model to securely outsource computation on sensitive data to a third party. Informally, the FHE model enables a user to encrypt their data, m, into a ciphertext $c=Enc(m)$, then send it to a third party, who can compute on c. The third party produces another ciphertext $c'$ encrypting $f(m)$ for some desired function $f$ (i.e.: $c'=f(c)=Enc(f(m))$). Thus, f was computed homomorphically.

In FHE, the third party receives only ciphertexts and a public key but never a secret key that allows decryption. As a result, sensitive inputs are protected under the security of the encryption scheme. Because the result of the computation remains encrypted, the output also remains unknown to the third party: only the holder of the secret key can decrypt and access it.

To achieve security, the ciphertexts of all FHE schemes are noisy: during encryption, a small noise term is added to the input data. Decryption can still recover the correct result, provided that the noise is small enough. To evaluate a function homomorphically, the function is represented in terms of operations provided by the scheme (typically addition and multiplication) and compute these operations on the encrypted inputs (i.e., there is no decryption when performing the operations). Each operation increases the noise in the resulting ciphertext, so only a limited number of homomorphic operations may be computed before a limit of decryption failure is reached.

Because multiplications increase ciphertext noise much more than additions, noise growth is modeled by a number of sequential multiplications only (i.e., noise from addition operations is ignored). If we compute the product from one to L for all data one to L homomorphically, then the computation requires multiplicative depth $[\log 2(L)]$. This is accomplished by writing the product in a tree structure, with each leaf node representing one of the factors. In general, there is a trade-off between computational cost and tolerating a larger L: FHE parameters may be increased to obtain more multiplicative depth, but in doing so, the homomorphic operations are slower and the size of the ciphertexts is larger.

To support the computation of functions regardless of their multiplicative depth, FHE uses bootstrapping, which reduces noise by decrypting a ciphertext homomorphically. Unfortunately, bootstrapping is very expensive, so its use is often minimized. There are several techniques to slow down the noise growth, which delays bootstrapping. However, bootstrapping and key switching tend to heavily dominate computation and data movement costs of an application: in a simple 1,024-point, 10-feature logistic regression, these tasks account for over 95% of the computational effort and the vast majority of data movement.

As discussed herein, embodiments systems and devices incorporate the homomorphic encryption scheme known as BGV encryption (named after the people who proposed the encryption scheme: Brakerski, Gentry, and Vaikuntanathan). However, other homomorphic encryption schemes (e.g., CKKS (Cheon-Kim-Kim-Son) FHE and others) may be used in other embodiments of the systems and devices discussed herein; BGV is used as an example. Plaintexts and ciphertexts are represented by elements in the ring $\mathscr{R} = \mathbb{Z}[X]/(X^N+1)$ with N a power of 2. Those elements are thus polynomials reduced modulo $X^N+1$, and this modular reduction is implicit a notation discussed herein. BGV guarantees finite data structures by also reducing the coefficients: the plaintext space is computed modulo t (denoted $\mathscr{R}_t$), and the ciphertext space is a pair of elements modulo q (denoted $\mathscr{R}^2_q$). Reduction modulo m (with m=t or q) is explicitly denoted by $[\cdot]$m. It is always done symmetrically around 0, i.e., in the set $[-m/2, m/2) \cap \mathbb{Z}$.

As with traditional ciphers, BGV has encryption and decryption procedures to move between the plaintext space and the ciphertext space. While these operations are never executed by the device performing outsourced computation, it is necessary to explain the ciphertext format in order to understand homomorphic operations. A BGV ciphertext $(c_0, c_1) \in \mathscr{R}^2_q$ is said to encrypt plaintext $m \in \mathscr{R}_t$ under secret key s (which has small coefficients) if $c_0 + c_1 \cdot s = m + te \pmod{q}$ for some element e that also has small coefficients. The term e is called the noise, and it determines if decryption returns the correct plaintext: as long as e has coefficients roughly smaller than q/2t, the expression m+te does not overflow modulo q. Therefore, the plaintext can be recovered uniquely as $m = [[c_0 + c_1 \cdot s]_q]_t$.

It has been observed that for $t = p^r$ with p an odd prime, the plaintext space $\mathscr{R}_t$ is equivalent to $\mathbb{Z}^\ell_t$ for some $\ell$ that divides N. This technique is referred to as packing, and it allows us to encode $\ell$ numbers into one plaintext simultaneously. Addition and multiplication over tuples in $\mathbb{Z}^\ell_t$ are then performed component-wise. As a result, one ciphertext can encrypt and operate on an entire tuple, which leads to significant performance gains and memory reductions in practice.

When BGV is used in conjunction with packing, we can define three basic homomorphic operations. Let $(c_0, c_1)$ and $(c'_0, c'_1)$ be two ciphertexts encrypting the tuples $(m_1, \ldots, m_\ell)$ and $(m'_1, \ldots, m'_\ell)$, then there are the following operations:

Addition: compute $([c_0 + c'_0]_q, [c_1 + c'_1]_q)$. The encrypted plaintext is $(m_1 + m'_1, \ldots, m_\ell + m'_\ell)$.

Multiplication: compute $([c_0 \cdot c'_0]_q, [c_0 \cdot c'_1 + c_1 \cdot c'_0]q, [c_1 \cdot c'_1]_q)$. The resulting ciphertext is a vector of three elements, but this can be reduced back to two with a post-processing step called key switching. The encrypted plaintext is $(m_1 \cdot m'_1, \ldots, m_\ell \cdot m'_\ell)$.

Permutation: compute $(\phi_k(c_0), \phi_k(c_1))$, where the map $\phi_k$ is called an automorphism. It is parameterized by an odd integer k, and defined as $\phi_k$: $c(X) \rightarrow c(X_k)$. These automorphisms induce a permutation on the elements of the encoded tuple, so the output encrypts some permutation of $(m_1, \ldots, m_\ell)$. Although the resulting ciphertext has only two elements, there is still a need for post-processing by means of key switching.

Basic homomorphic operations (as identified above as addition, multiplication, and permutation) lead to ciphertext expansion and noise growth. Take for example a product ciphertext: it consists of three elements and it is encrypted under $(s, s^2)$ instead of s. The same problem occurs during permutation: the automorphism $\phi_k$ has a side effect on the secret key, so the resulting ciphertext is encrypted under $\phi_k(s)$. Also noise growth is an issue: the noise term in a product ciphertext, for example, has increased to $te \cdot e'$.

To prevent ciphertext expansion, switch between keys and slow down noise growth, BGV defines two auxiliary procedures:

Modulus switching: given a ciphertext $(c_0, c_1) \in \mathscr{R}^2_q$ and a new modulus q', compute a ciphertext $(c'_0, c'_1) \in \mathscr{R}^2_{q'}$ that decrypts with respect to q'. Modulus switching also scales the noise by a factor of q'/q.

Key switching: given a key switching matrix (vector($k_0$), vector($k_1$)) and either a product ciphertext $(c_0, c_1, c_2) \in \mathscr{R}3q$ or a permuted ciphertext $(c_0, c_1) \in \mathscr{R}2q$, compute a ciphertext $(c'_0, c'_1) \in \mathscr{R}2q$ that decrypts under $c_0 + c_1 \cdot S = m + te \pmod{q}$. Thus key switching brings the ciphertext back to its original format.

In summary, modulus switching is run before each multiplication to reduce the noise to its minimum level. Key switching is run after each permutation or multiplication to keep the ciphertext format consistent.

When the entire noise budget of a ciphertext is consumed (equivalently, when the modulus q is depleted to its minimum value by successive modulus switchings), further homomorphic operations are no longer immediately possible. However, a bootstrapping procedure that reduces the noise back to a lower level may overcome this problem. Bootstrapping "refreshes" a ciphertext by running decryption homomorphically: we first evaluate an adapted version of the $c_0 + c_1 \cdot S = m + te \pmod{q}$ equation discussed above, followed by coefficient-wise rounding The following table indicates parameter ranges and examples for devices and systems described herein:

| Parameter | Range | Example |
|---|---|---|
| Security parameter | N/A | 128 bits |
| Ring dimension N | 512-65536 | 65536 |
| Plaintext modulus pr | >2 | $127^3$ |
| Ciphertext packing $\ell$ | 2-65536 | 64 slots |
| Max $\log_2$(QP) for key switching | 20-1782 | 1782 bits |
| Max $\log_2$(Q) for ciphertext | 20-1782 | 1263 bits |
| Max multiplicative depth L | N/A | 31 |

Turning now to the figures and in particular to FIG. 1, a device 100 for executing programs and processing data that have been homomorphically encrypted is shown. In many embodiments, the device 100 is a daughter card or other type of printed circuit board that includes an interface 102 to a host system. The interface 102 can be any high-speed bus structure including, but not limited to, Peripheral Component Interconnect extended (PCI-X), Peripheral Component Interconnect Express (PCIe). Rapid I/O, HyperTransport, etc. As with any interface, the interface 102 of the device 100 includes pins 104 that may be unidirectional data pins, bidirectional data pins, power pins, ground pins, etc., depending on the bus structure associated with the interface 102. Further, in several embodiments, a custom bus structure is used as the interface 102.

In most embodiments, the device further includes a mass memory 108 for storing data. The mass memory 108 may be any reasonable type of memory. For example, the mass memory 108 can be one or more double data-rate (DDR) random access memory (RAM) chips, other RAM chips (dynamic RAM, static RAM, etc.), flash, high-bandwidth memory (HBM), etc.). The mass storage 108 serves as the staging area for data that is scheduled for processing and for results that are ready for retrieval by the host system.

A high-speed interconnect 110 is coupled between the interface 102 and the mass memory 108. The interface 102 receives input data (e.g., homomorphically encrypted data), and memory controllers (e.g., memory access interface 106a, 106b) interface with the memory to store the received data.

In many embodiments, there are two RAM chips 108a, 108b used for the mass memory 108. Twin double-data-rate interfaces allow for a maximized practical throughput by avoiding collisions between the interface-to-mass-storage access stream and the dedicated-fully-homomorphic-encryption-accelerator-to-mass-storage access stream. Each memory chip 108a, 108b will have the corresponding memory access interface 106a, 106b to communicate with the high-speed interconnect 110.

Several embodiments of the device 100 also include a joint test action group (JTAG) interface 120 for debugging the dedicated fully homomorphic encryption accelerator 114 and a configuration system 122 including a configuration JTAG interface 124, a RISC processor 126, and low-speed input/outputs 128. In some embodiments, the device 100 further includes a secondary bus 130 for direct communication with a remote dedicated fully homomorphic encryption accelerator on a similar remote apparatus.

The dedicated fully homomorphic encryption accelerator 114, the JTAG interface 120 for debugging the dedicated fully homomorphic encryption accelerator 114, the configuration system 122 and the secondary bus 130 may all be part of the same application specific integrated circuit (as shown in FIG. 1), may all be discrete chips, or may be spread among two or more chips.

The dedicated fully homomorphic encryption accelerator 114 includes a memory buffer (herein called a ciphertext buffer (CTB)) 140 and several processing elements 150 (discussed below). As will be discussed below, the processing elements 150 may also include memory structures. The CTB 140 should be about three orders of magnitude less than the mass storage 108. For example, if the mass storage includes 256 gigabytes (GB) of memory, then the CTB 140 can be about 64-256 megabytes (MB). However, the CTB 140 should be considerably faster; for example a round-trip latency for the mass storage can be over 100 nanoseconds (ns) while the round-trip latency for the CTB 140 should be about 3 ns.

As an example, the CTB 140 includes 64 MB. In such a CTB 140, there are $2^{24}$ (~16 million) locations, each of which holds a 32-bit (doubleword (dword)) residue polynomial coefficient for use in processing the encrypted data. Continuing with the example, a single residue polynomial includes $N=2^{16}=64K$ coefficients and occupies one entire page of the CTB 140. For smaller ring dimensions, a single CTB page will include multiple residue polynomials. In some embodiments, the CTB 140 is a single-port SRAM (static random access memory) array that can either read or write 2048 32-bit residue polynomial coefficients every machine cycle, providing a total bandwidth of 8 Tb/s (Terabit per second) (at 1 GHz operation) to the Processing Elements (PEs) 140 (discussed below).

Data-dependent control flow such as branching and iteration does not exist in FHE since variables are encrypted. As an advantage of this determinism, allocation and size of all data and operands are bound at compile-time. This allows the CTB 140 to be structured as an addressable set of ciphertext registers, instead of requiring the complex functionality of a run-time cache memory. This set of registers is compiler-managed with a true Least-Recently Used (LRU) replacement policy. In some embodiments, values that are known not to be used again will be retired. CTB 140 bandwidth is not materially affected by concurrent transfer between the mass memory 108 and the CTB 140: roughly at most 0.3% of CTB 140 access cycles are used by the mass memory 108 bandwidth. In other words, access to the CTB is predominantly local.

For many applications, the CTB 140 is too small (e.g., 64 MB) to hold sizeable working sets of ciphertexts and key switching matrices. As such, the mass memory 108 ensures that CTB 140 capacity misses do not have to spill to memory of the host system.

The dedicated FHE includes memory access interfaces 142a, 142b, a direct memory access (DMA) structure 144, an instruction queue 146, as well as a traffic control unit 148.

As mentioned above, the dedicated fully homomorphic encryption (FHE) accelerator 114 also includes processing elements (PEs) 150. There are three basic types of PEs in the dedicated FHE accelerator 114: Multiply-Accumulate (MAC) PEs 152, Permutation PEs 154, and NTT (Number-Theoretic Transform) PEs 156. Multiple PEs 150 work in parallel to quickly perform operations on the encrypted data using at least four types of parallelism: (i) over multiple ciphertexts, (ii) over polynomials within a ciphertext, (iii) over residue levels of a polynomial, and (iv) over coefficients of a residue polynomial. Instead of focusing on (iii) residue levels of a polynomial (similar to current methods of processing FHE data), the dedicated FHE accelerator 114 of the present disclosure focuses on (iv) exploiting coefficients of the residue polynomial for at least two reasons: (1) the number of residues decreases with the modulus level in the BGV scheme, leading to would-be idle RPAUs (residue polynomial arithmetic units) as the computation gets closer to bootstrapping; and (2) as the lowest level of parallelism, coefficient-level parallelism offers the best opportunity to exploit locality of reference.

Because of the focus on the coefficient-level parallelism, in numerous embodiments, NTT PE 156 is a high-radix NTT PE that employs a radix-256 butterfly network to allow the dedicated FHE accelerator 114 to employ ring dimension $N=256^2$ to enable bootstrapping and arbitrary-depth computations. Thus, the NTT PEs can compute $256^2$-point with only two round trips to memory for each coefficient. Smaller NTTs may also be computed with the NTT PEs through shortcuts in the butterfly network.

Figure 2:
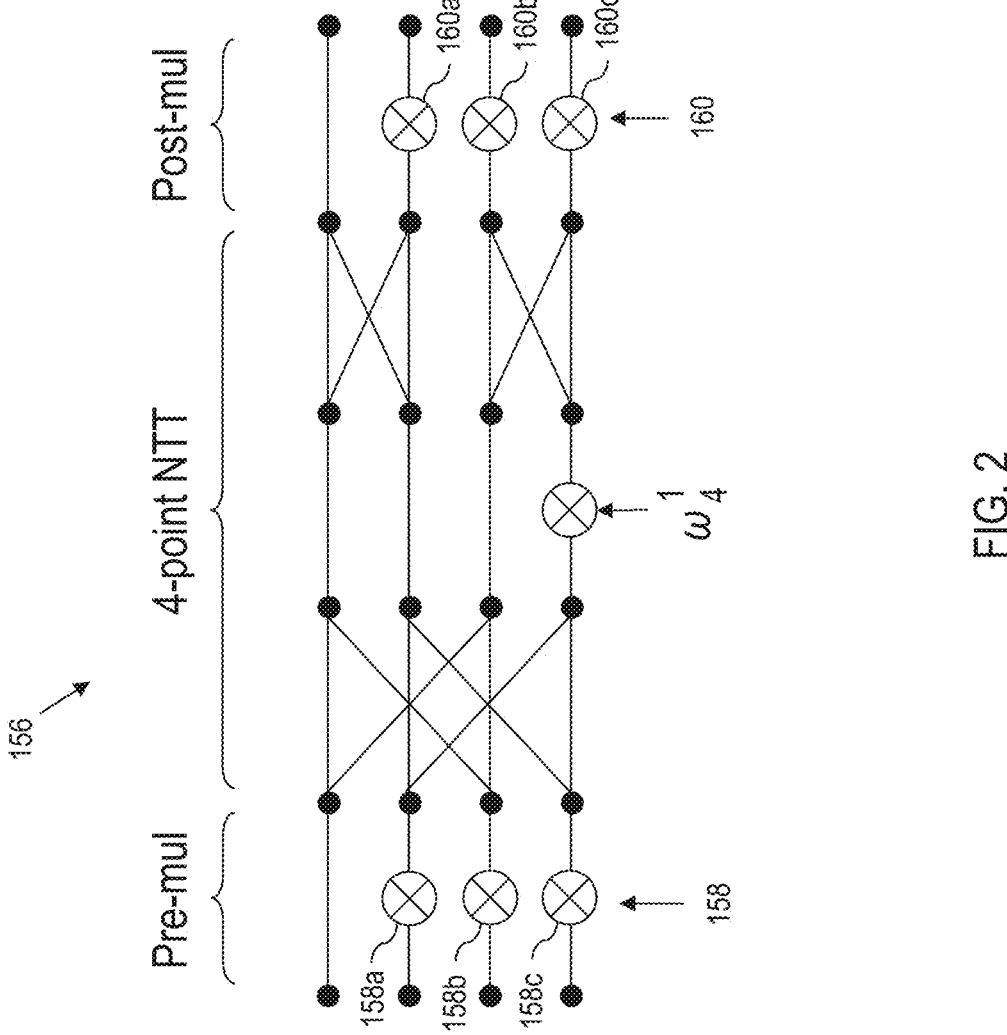
FIG. 2 is a diagram illustrating a radix-4 NTT element for use in the dedicated FHE accelerator of FIG. 1, according to various aspects of the present disclosure.
Figure 3:
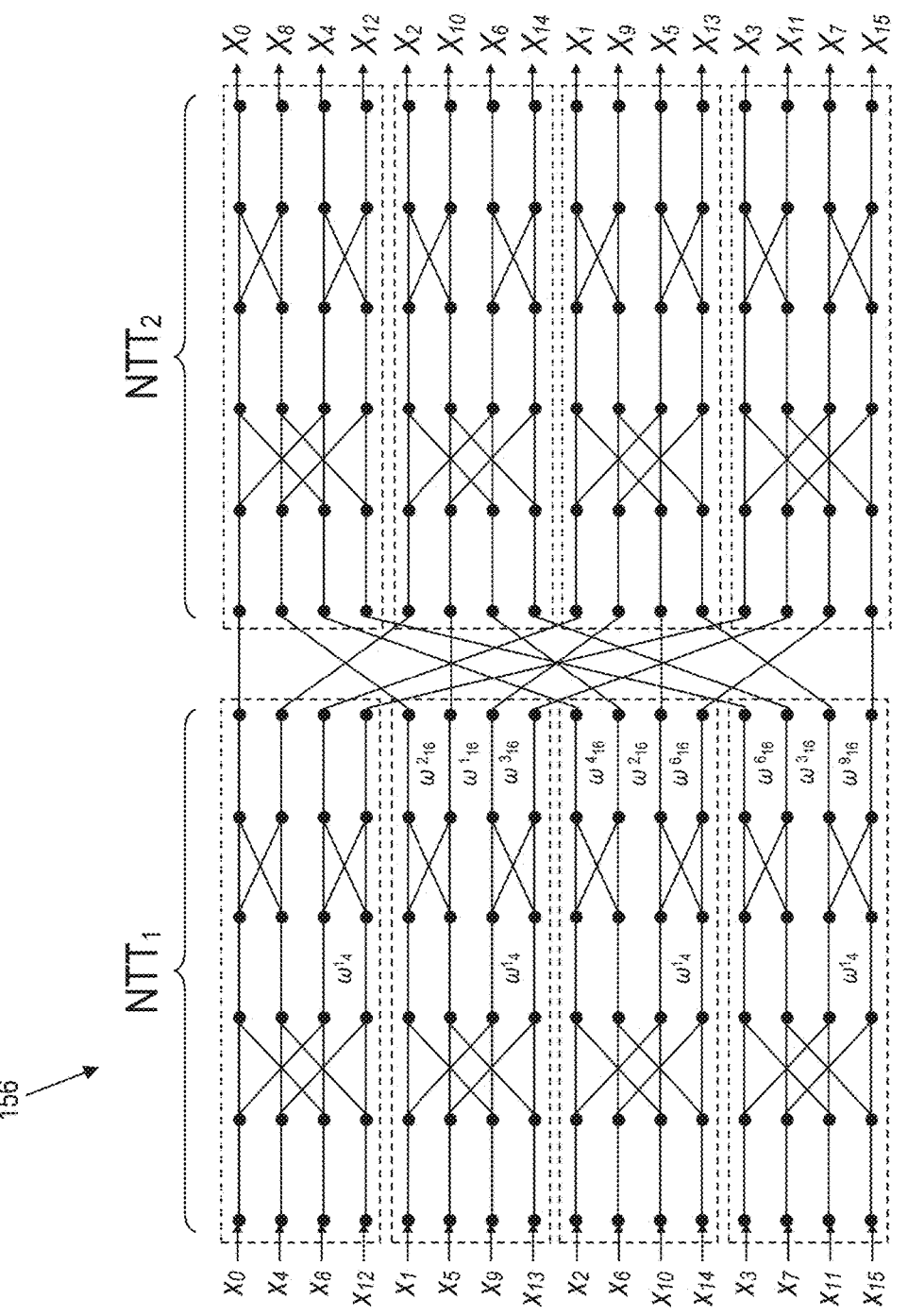
FIG. 3 is a diagram showing a radix-16 NTT built using several radix-4 NTTs of FIG. 2, according to various aspects of the present disclosure.

FIG. 2 illustrates a radix-4 negacyclic NTT unit with a pre-multiplier array 158 and a post-multiplier array 160. Note that only three of the inputs have multipliers 158a-c and three of the outputs have multipliers 160a-c. The result is a three-stage NTT architecture. FIG. 3 illustrates how to use the radix-4 NTT unit of FIG. 2 compute the full NTT flow graph in two passes that each take 4 chunks. In between passes through the NNT architecture is an implicit memory transposition that is enabled with a conflict-free CTB design—discussed herein. The NTT PE 156 uses four parallel three-stage NTT units. In several embodiments, each NTT unit is pipelined (e.g., forty pipeline stages) in order to run at high clock speeds (e.g., 2 GHZ). Together, these four parallel pipes consume 1024 32-bit residue polynomial coefficients at that 2 GHz rate-sufficient to consume all available data bandwidth from the CTB (150, FIG. 1).

A known performance inhibitor for NTTs is that successive NTT passes access coefficients at different memory strides, introducing access conflicts in memory. Current NTT accelerators present custom access patterns and reordering techniques that only work for small-radix NTT architectures or require expensive in-memory transpositions. However, such solutions do not work well for higher-radix (e.g., radix-256) architectures.

Conceptually, a $N=N_1N_2=256^2$-point radix-256 NTT can be represented as a two-dimensional NTT, where the data is laid out with $N_1=256$ rows and $N_2=256$ columns. In this format, the inner $N_1$-point NTT coefficients are in column-major order, whereas the outer $N_2$-point NTT data is in row-major order. The crux of building conflict-free NTT schedules is to structure the data so that it can be read out in either order without bank conflicts. This requires a minimum of 256 independently addressable banks, each containing 216 bank addresses (for a total CTB size of 224 values).

In various embodiments of the FHE accelerator (114, FIG. 1), encrypted data are packed in ciphertexts that consist of very large arrays of polynomial coefficients. As an example, each ciphertext polynomial in the current implementation is stored as two arrays, each including 32 residue polynomials of 65536 coefficients each. In order to support all the required operations fast and efficiently, the data gets stored in a two-dimensional layout (e.g., 256 rows×256 columns, 128 by 128, etc.). Some operations require the data in row-major order and sometimes in column-major order. However, in order to sustain the full processing throughput the memory subsystem should be able to access one full row per cycle or one full column per cycle without any conflicts in addressing, meaning that each memory instance in the memory array will be accessed exactly once per operation at a single address for all the required data. In general, addressing all the elements of a row in parallel is trivial if they are all stored in one row of the memory array. However, when accessing columns, stripes of the memory are addressed with independent addresses, but elements of the same column must not conflict on the same stripe.

Figure 4:
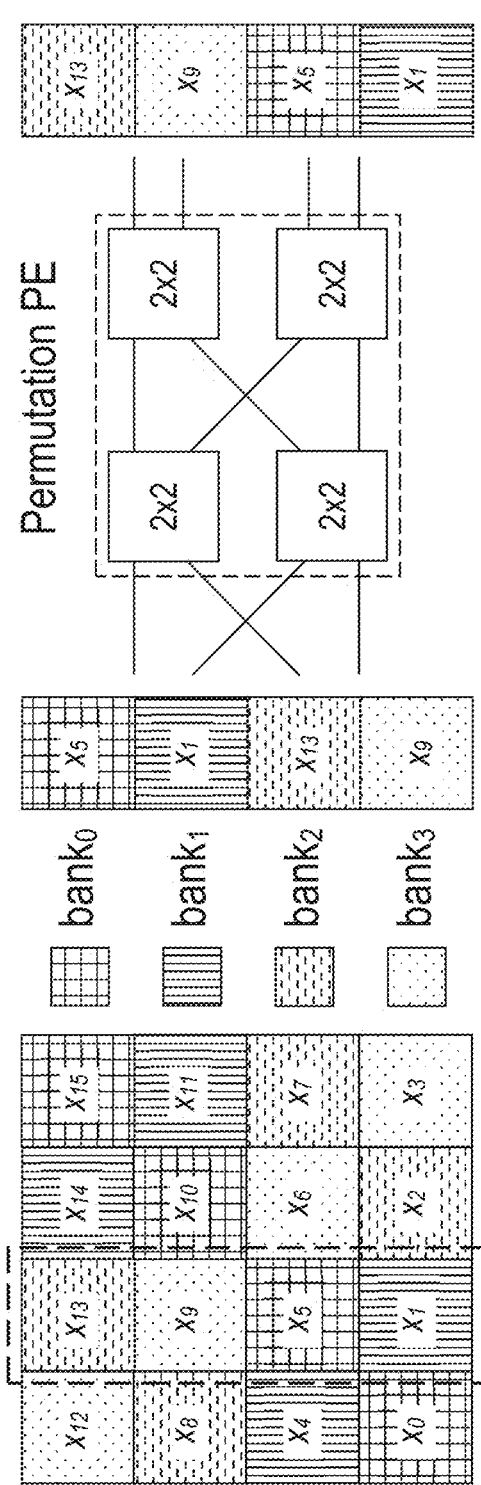
FIG. 4 is a block diagram illustrating a conflict-free memory access, according to various aspects of the present disclosure.

A conflict-free layout is employed based on XOR (exclusive OR) permutations, as illustrated in FIG. 4. In this layout, data with logical address {row, col} is stored at bank=row⊕col. This layout ensures that each unique index for every element in every row and column corresponds to a unique physically accessible bank of CTB memory (150, FIG. 1). Coefficients within a residue polynomial are arranged in a scrambled ordering to achieve conflict-free addressing. A "chunk" is defined as the number of coefficients to be accessed per cycle and is a multiple of the column or row width. For example, in a 2-dimensional matrix of size 256-by-256, four adjacent rows or columns may be accessed in a single cycle as a 4-by-256 or 256-by-4 sub-matrix chunk.

To derive the address location of a row/column in a particular memory the chunk index is XORed with the column/row index respectively, aligned at the MSB. For example, when reading rows or columns from the CTB, values come out of memory in bank order, one value for each bank from bank 0 to 255. However, operations like NTT require values in natural order: when accessing a row, values are sorted by column from 0 to 255, and when accessing a column, values are sorted by row from 0 to 255. Thus, when accessing row r, bank i is mapped to index i⊕r. Likewise, when accessing column c, map bank i is mapped to index i⊕c.

For example, if chunk size=row size=column size=256, then 256 independently addressable memory banks are required. For row mode, col={chunk$^{i[7:0]}$} for i=[0,255]. For column mode, row={chunk$^{i[7:0]}$} for i=[0,255].

In another example, if chunk size=2 times the row size, and row size=column size=256, then 128 independently addressable memory banks are required. For row mode, col={chunk$^{i[7:1], i[0]}$} for i=[0,255]. For column mode, row={chunk$^{i[7:1], i[0]}$} for i=[0,255].

Similarly, if chunk size=4 times the row size, and row size=column size=256, then 64 independently addressable memory banks are required. For row mode, col={chunk$^{i[7:2], i[1:0]}$} for i=[0,255]. For column mode, row={chunk$^{i[7:2], i[1:0]}$} for i=[0,255].

In a further example, if chunk size=8 times the row size, and row size=column size=256, then 32 independently addressable memory banks are required. For row mode, col={chunk$^{i[7:3], i[2:0]}$} for i=[0,255]. For column mode, row={chunk$^{i[7:3], i[2:0]}$} for i=[0,255].

This approach may be extended further to an even higher degree of parallelism by reducing the bits of the chunk index and XORing the upper bits of the row and column index with the chunk index while leaving the rest of the index unmodified.

In many embodiments, a physical mapping of the ciphertext buffer (CTB) includes 1024 SRAMs organized into sixty-four bank sets of sixteen SRAMs. All SRAMs in a bank set share an address line, so when accessing chunks in row-wise mode (memInstr_bits_rowCol=='0'), the physical SRAM addresses for all bank sets are equal to memInstr_bits_memAddr. However, this is not the case for column-wise access. In column-wise access mode, the sixty-four addresses to each bank set are calculated by the CTB based on the value of memInstr_bits_memAddr and an index [0-63] assigned to the bank set. For these address calculations, it is useful to break the thirteen-bit memInstr_bits_memAddr into a seven-bit page [12:6] and a six-bit chunk [5-0]. A further bit determines whether the access is row-wise or column-wise.

As described above, a custom "on-the-fly" Permutation (PE 154, FIG. 1) computes these XOR-based permutations as data moves to or from the other PEs in the accelerator. By implementing a slightly more general permutation PE (discussed below) that supports permutations of the form i→(i·a+b)⊕c, the Permutation PE may be used to implement conflict-free XOR permutations, but also any BGV ring automorphism without additional hardware.

In several embodiments, the CTB includes coefficients within a residue polynomial that are arranged in a scrambled ordering to achieve conflict-free addressing. The 256 coefficients on the input of a single permutation PE (discussed in detail below) are ordered for row mode as: col={chunk^i[7:2], i[1:0]} for i=[0,255], and for column mode as: row={chunk^i[7:2], i[1:0]} for i=[0,255]. The permutation PE reorders data coming out of the CTB, as discussed below.

Using these types of structures, the lack of conflict when addressing the CTB allows all the data to be stored in single-port memories and with a single-cycle operation per chunk without loss of performance.

In alternate embodiments, instead of the XOR method described above, other methods to ensure conflict-free memory access exist that also ensure that that every column index maps to a different physical memory of the memory array. For example, generating the column index by incrementing an array location using a number that is relative prime to the width of the array. However, such an addressing scheme would require more complex logic than the XOR method described above.

Similar to polynomial residue coefficients, twiddle factors of many embodiments of the dedicated FHE accelerator described herein are 32-bit integers. However, several embodiments use different sizes for twiddle factors (e.g., 64 bits, 80 bits, 128 bits, etc.) to the point where the size of the twiddle factors may be variable and set with a parameter. Regardless, for a ring of dimension N, there are N−1 twiddle factors for each residue for both forward and inverse NTT, and a maximum of 56 residues at max-capacity key switching, together requiring ~29.4 MB of twiddle factor material in a naïve implementation. Normally, the four NTT units have 5116 multipliers total that must be fed each cycle with twiddles, requiring massively parallel access into this storage memory. However, the FHE accelerator prevents this storage requirement in two ways. First, a new twiddle decomposition method reduces a required parallel number of distinct twiddle accesses. Second, a custom twiddle factor factory drastically reduces a number of twiddles stored.

Moreover, twiddle factors are different between forward NTT operations and inverse NTT operations. As the amount of memory needed to store the twiddle factors ranges in tens of megabytes, it would time consuming to load onto the chip through external memory or the host interface every time an NTT operation needs to be performed. Therefore, the twiddle factors are determined on chip via mathematical PEs (e.g., MACs, etc.) on the fly. and consumed at full speed to keep the NTT unit processing at the desired throughput without stalling. A very small number of the parameters are needed to be stored ahead of time and stored and the rest can be determined using multiplications, as they are powers of the same constant (root of unity).

The twiddle factors are split into three categories, specifically corresponding to the time needed for processing relative to the NTT operation: (1) Pre-twiddles, which are the constants that are multiplied by the data before the NTT operation; (2) Butterfly twiddles, which are the constants that are used by the NTT butterfly network itself during the NTT operation execution; and (3) Post-twiddles, which are the constants that are multiplied by the data after the NTT butterfly operation.

For a forward negacyclic NTT, each input $x_i$ is premultiplied (using the pre-multipliers 158, FIG. 2) by the twiddle $\phi^i = \omega^i_{2N}$. The additional negacyclic twiddles are decomposed to extract a regular pattern and are distributed evenly between the two NTT passes in the flow graph. This provides benefits over other solutions. For example, it can be seen that the pre-multiplications become identical for each chunk in both passes. This allows the four NTT units to share the same pre-multiply twiddle which drastically reduces the total number of pre-multiply twiddles from $N=256^2$ to $2 \cdot \sqrt{N}$, easily fitting in a smaller amount of memory. Further, the internal butterfly twiddles (powers of $\omega_{256}$) are a strict subset of the pre-multiply twiddle in the first pass (powers of $\omega_{512}$), so both can be routed from the same small memory.

The remaining twiddle factor complexity sits in the post-multiply twiddles. For each chunk k, there are 255 twiddles $\omega^{ik}_{256}{}^2$. A memory storing vectors of 255 twiddles with depth 255 for each residue is still much too large. To reduce the width, a power generator circuit trades memory storage for multipliers. The main idea is as follows. By using the identity $w^{ik}_{256}{}^2 = \omega^i_{256}{}^2_{/k}$ it can be observed that the required twiddles for chunk k are always the 255 consecutive powers of a seed value $\omega = \omega_{256}{}^2_{/k}$. Using only a single seed w, its successive powers can be computed in a number of multiply layers. The first layer computes $\omega^2$ from $\omega$, with a single multiplier. The second layer takes $\omega^2$ and $\omega$ to compute $\omega_4$ and $\omega_3$, and so forth. Every multiplier in the circuit produces a unique value that is used as an output, so to generate 255 powers from a single $\omega$ requires only 254 multipliers. Using this technique to calculate twiddle factors while data is being processed instead of storing vectors of 255 twiddles with depth 255 for each residue, it suffices to store just the single seeds with depth 255. Thus, very little long-term storage is required. Additionally, by not having to retrieve roots of unity from the main memory of the FHE accelerator halves the memory bandwidth requirements of the computation.

There are tradeoffs between the number of roots that are saved versus the number of roots that are calculated on the fly. Storing more parameters lowers the latency and complexity of the computation but requires more storage area and vice-versa. In a balanced approach, where enough powers of the root of unity are stored so that the entire computation of the rest can be completed in a similar amount of time as the computation that will utilize them. This way the values are generated when they are needed and then discarded and do not need to be pre-computed until they are needed, so they do not have to be stored at all before or after they are used.

The techniques above can be used for the inverse NTT as well.

The permutation PE is a processing element that (for a Permutation PE with a size of SIZE) receives SIZE values as an input and produces SIZE values at the output, where SIZE is a power of two and the output is a re-ordered version of the input. As discussed above, a slightly more general permutation PE supports permutations of the form $i \rightarrow (i \cdot a + b) \oplus c$, such that the Permutation PE may be used to implement conflict-free XOR permutations, but also any BGV ring automorphism without additional hardware. Each permutation unit reorders an array of input coefficients to produce a permuted output array of the same length.

Concatenating two permutation PEs provides for implementation of all required permutations of input to output rotations, which allows the device to perform the automorphism and NTT operations without using additional memory. For example, this means that the data gets read out of memory one row at a time, gets reordered on the fly, and gets written back in the same location in memory they came from, without needing to use temporary scratch memory for any intermediate results.

In concatenated permutation PEs, a first permutation PE is a read permutation PE, and a second permutation PE is a write permutation PE. Note however, that the generic structure of both permutation PEs are the same: logic to perform $i \rightarrow (i \cdot a + b) \oplus c$ (as is known, the $\oplus$ symbol is an exclusive OR (XOR)). The Read Permutation PE unscrambles data in conflict-free CTB bank ordering in order to pass it to the other PEs expecting natural ordering (e.g., an NTT PE, an arithmetic PE, etc.). It is a specialized instance of the more general permutation PE that only implements permutations $i \rightarrow i \oplus c$, requiring values $a=1$ and $b=0$ (c ranges from 0 to SIZE-1). The input array from the CTB banks at each sender (i) is sent to an output as i XOR c.

The Write Permutation PE passes data in the opposite direction (i.e., from the NTT to the CTB). It implements the general permutation $i \rightarrow (i \cdot a + b) \oplus c$ (where a is an odd number) in order to re-scramble the data into its conflict-free layout, or to compute ring automorphisms. This class of permutations is sufficient to perform any ring automorphism in combination with the shuffling required by the conflict-free memory layout. For testing, the formula can be written as permutation $i \rightarrow (i \cdot a + b) \% SIZE \oplus c$, where % is a modulo operator.

In the latter case, the output of the Read Permutation PE is fed directly into the input of the Write Permutation PE to achieve the complete operation of the automorphism. As can be seen, the Read permutation PE includes $a=1$ and $b=0$, but the Write permutation PE does not impose that restriction—only that a be an odd number. In some implementations, the Read permutation PE may be hardcoded to include $a=1$ and $b=0$ to reduce the amount of logic required for those permutation PEs.

Figure 5:
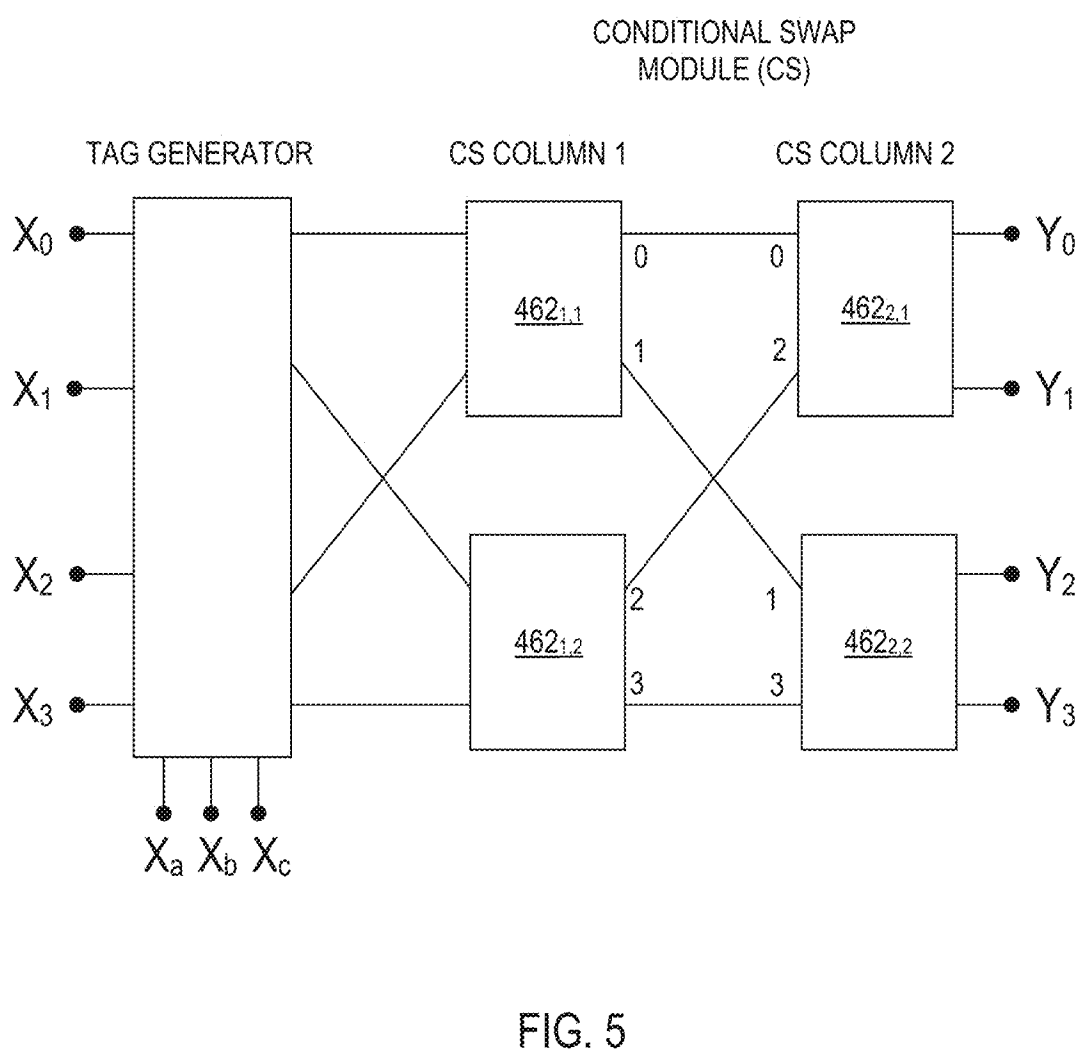
Figure 6:
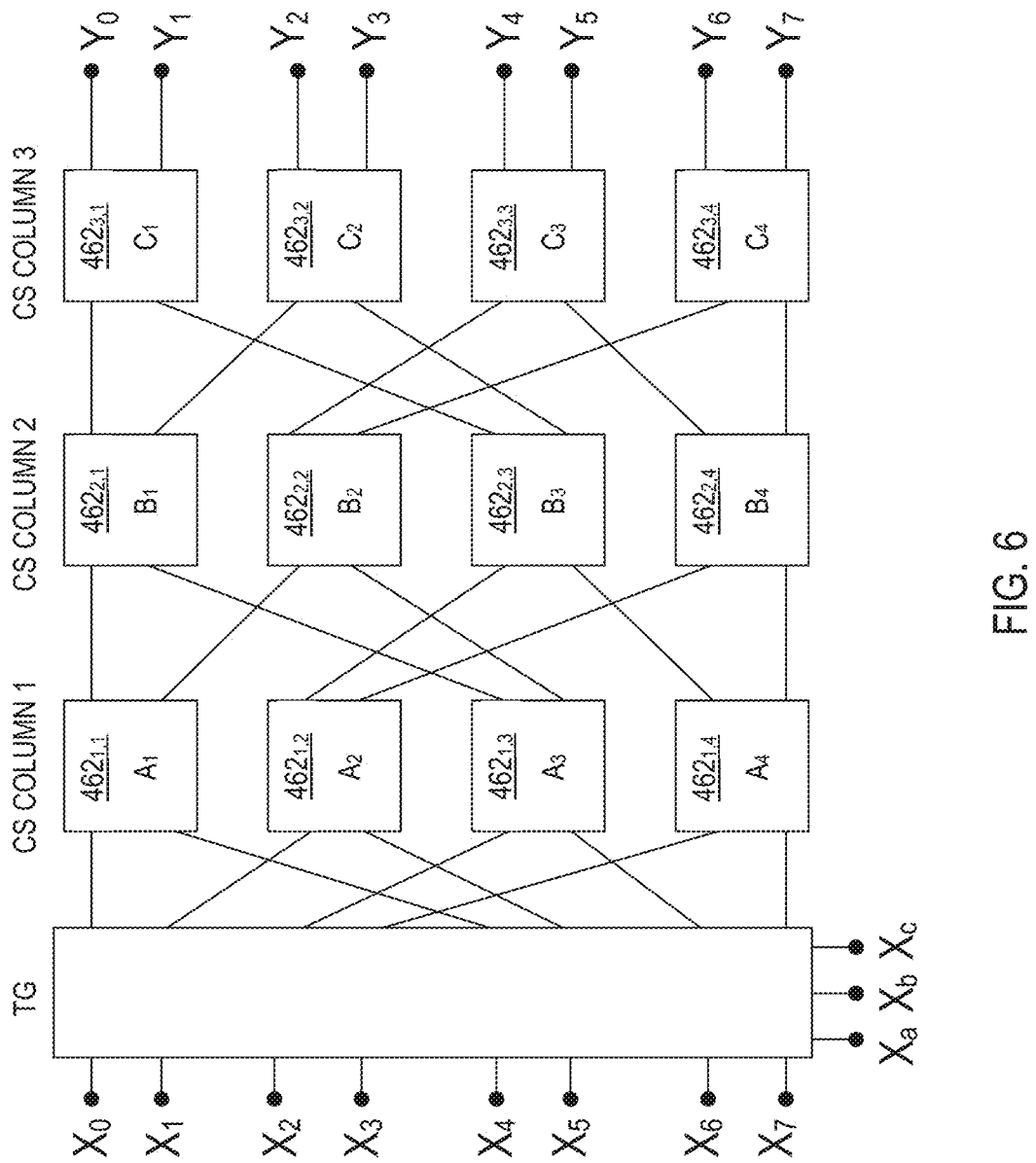
FIG. 6 is a block diagram illustrating a size-four permutation processing elements (PE), according to various aspects of the present disclosure.

As discussed above, a permutation PE can be sized to any power of two. For example, FIGS. 5-6 illustrate size-four and size-eight permutation PEs. Each permutation PE includes inputs $X_{0-(SIZE-1)}$, inputs for a, b, and c $X_{a-c}$, outputs $Y_{0-(SIZE-1)}$, and a network of several conditional step nodes (CSs) $562_{k,r}$. The CSs are arranged in columns and rows, where k is a numbered column and r is a numbered row. For example, $562_{2,1}$ is a CS in column 2, row 1. A number of rows and columns is based on the size of the permutation PE (SIZE) using the equation $k=\log_2(SIZE)$ and $r=SIZE/2$. Therefore, as can be seen in FIG. 5, a size-four permutation PE includes two columns and two rows of CSs, while a size-eight permutation PE includes three columns and four rows.

Using the values of the (a, b, c) inputs, a routing tag $(i \rightarrow (i \cdot a + b) \% SIZE \oplus c)$ can be added to the input data at each CS 562 node to facilitate a routing process without having to control each individual CS node 562 in the network externally. The tag will have size $\log 2$ (SIZE). At each CS node the tag is inspected and if a control value is one, then the inputs values to the CS node are swapped. Otherwise, the values on the inputs of the CS node pass through in the same order they arrived. The control bit for a node at column j of the network corresponds to the $j^{th}$ bit of the tag value.

Note that in some embodiments, when values are sent to the CS nodes, there are appended bits of the values that include the control bits that are only used for a specific column. Therefore, in some embodiments, additional optimization of the permutation PE architecture may include reducing the number of bits of the value sent to the CS nodes by one for every column, because once a bit is used at a column (for that column), the bit may be removed from the values being sent between CS nodes.

In other embodiments, the control bits may be stored in tables or calculated and transmitted differently to the CS nodes.

In numerous embodiments, the permutation PEs are arranged in a network topology such that each node receives a pair of inputs and either outputs them in the same or reversed order. A small network 460 is shown in FIG. 4 to create a 4×4 network from four 2×2 permutation PEs. However, other topologies may be used (e.g., a 256 by 256 as discussed above).

In an example permutation PE network, if it is assumed that the width of the PE network is a power of 2 and a, b and c are the three coefficients, any permutation of the form $i \rightarrow (i^*a+b)$ XOR c, for any a (being an odd number), b, and c may be performed. This class of permutations is sufficient to perform any ring automorphism in combination with the shuffling required by the conflict-free memory layout.

In quick summary, assuming the size of the permutation PE is a power of 2 and a, b and c are the three coefficients, any permutation of the form $i \rightarrow (i^*a+b)$ XOR c, for any a (being an odd number), b, and c can be performed. This class of permutations is sufficient to perform any ring automorphism in combination with the shuffling required by the conflict-free memory layout discussed herein.

As discussed above, the dedicated FHE accelerator uses key-switching to homomorphically encrypt and decrypt the data. These key-switching operations require keys that are large and pre-calculating them in advance and storing them in memory takes a substantial amount of memory storage as well as a large amount of memory bandwidth when fetching them from external memory. However, it has been found that a first half of each of the keys is just required to be randomized (with a uniform distribution over a finite field).

Therefore, in some embodiments, a finite field random number generator (i.e., a uniform random number generator) with a programmable seed and modulus parameter is used to generate the first half of each key-switching key as it is needed (i.e., "on the fly") instead of pre-calculating and storing both halves of the key-switching keys in memory. The programmable seed provides repeatability in generating the same key multiple times if needed. This on-the-fly calculation cuts down on required memory space and reduces memory bandwidth to about half during key-switching.

Further, in various embodiments, instead of the second half of a key-switching key being pre-calculated, the second half of a key-switching key is generated based on the first half of a key-switching key and may be further based on user data, program data, or both. Thus, the second half of the key-switching key may be pre-calculated and stored in memory or may be derived on-the-fly from the first half of the key-switching key.

In implementations where the first half of each key-switching key is generated using a random number generator, for each prime modulus a full residue polynomial worth of random data is generated. Therefore, the logic necessary to make the logic for the random number generator fast. Thus, the random number generator should have a large degree of parallelism to ensure timely generation of a random polynomial, (OUTPUT_SIZE). The random number generator generates OUTPUT_SIZE random numbers per cycle. A residue polynomial has N number of residues, so the random number generator requires N/OUTPUT_SIZE number of cycles to generate the full polynomial.

In several implementations, the random number generator operates in two modes: configuration mode and generation mode. In configuration mode, configuration commands are used to configure the random number generator, which occurs before generation mode. In configuration mode, generation parameters (e.g., sent as part for the configuration commands, determined using the configuration commands, etc.) are set up and stored in registers for the random number generator to use in generation mode. For example, generation parameters may include s_val (seed value), g_val (generator value), p_val (prime modulus value), rng_val, etc.

In generation mode, the random number generator generates OUTPUT_SIZE values per cycle. For proper seeding, each period p_val corresponds to OUTPUT_SIZE s_val values. There are two p_val and s_val setting strategies to avoid the parallel generators from producing overlapping/correlated values.

Figure 7:
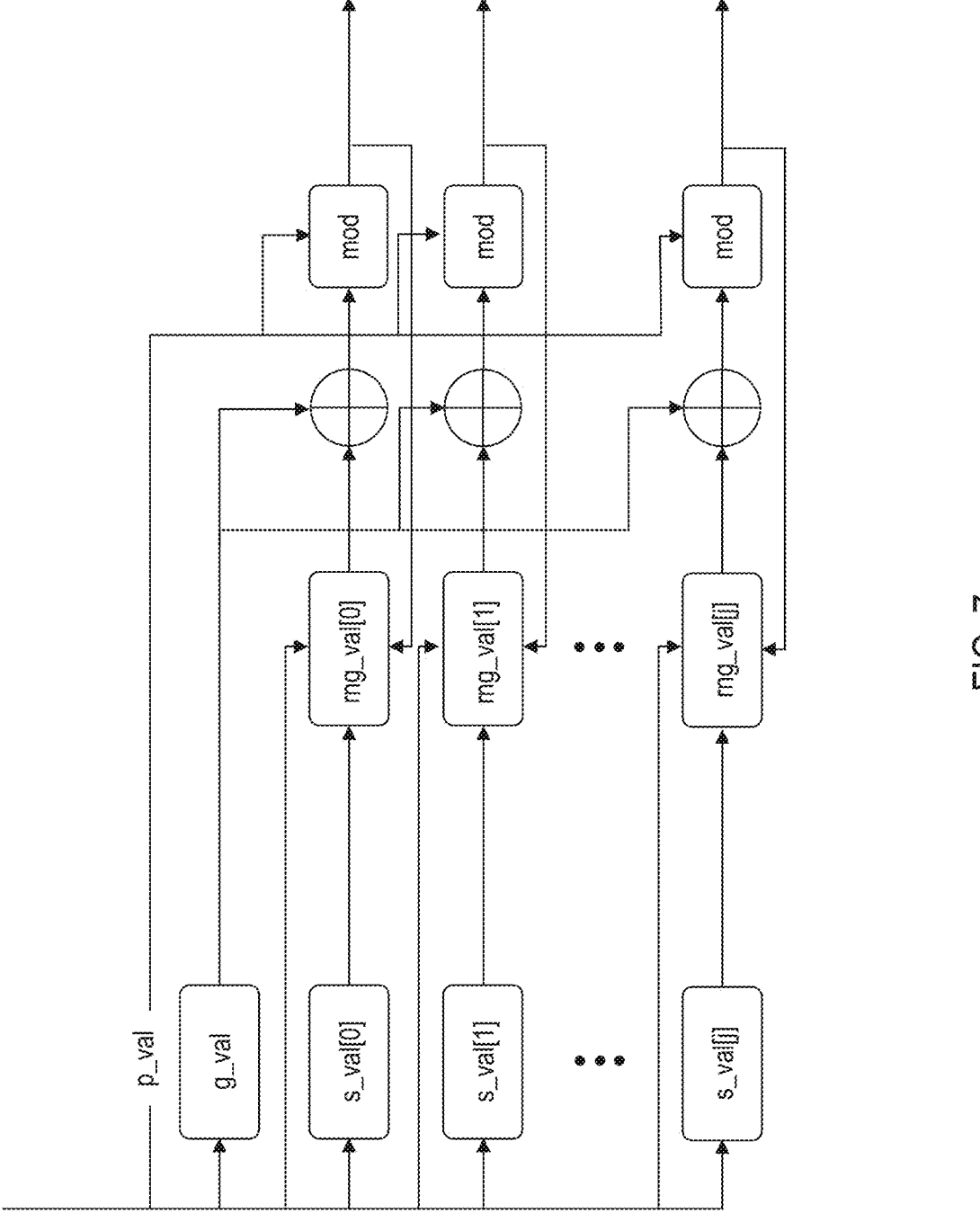
FIG. 7 is a block diagram of a random number generator, according to various aspects of the present disclosure.

In the first setting strategy, the s_val are equally spaced in the period p_val, so that:

$$s\_val[i, j] =$$
$$\left(s\_val[i, j-1] + g\_val[i] * \left(p\_val[i]/OUTPUT\_SIZE\right)\right) \bmod p\_val[i]$$

for j=1 .... OUTPUT_SIZE-1, As shown in FIG. 7. In other words, each of the parallel generators should be running over a non-overlapping segment of the random number generator's period, which is commonly equal to the prime modulus of the polynomial that is being generated.

In the second setting strategy, the random number loads a seed number into a register (based on the configuration commands): rng_val[I,j]=s_val[I,j], for all j. The random number generator also receives p_val[i] which is used for the modulo operation. Further, the RNG loads an appropriate g_val[i] from the configuration in order to set up the generate command.

After receiving a generate command, the random number generator generates data for as many cycles as needed to generate data needed to produce one residue of the key-switching key (or half-key), starting from the last value generated and updating forward. For each cycle, the random number generator does not reload the seed, prime, generator values, or combinations thereof, but instead continues from where it left off. If the parameters for the generator need to change then a configuration command is necessary. The process repeats for each residue of the key-switching key until the full key-switching key is assembled. Each residue polynomial has its own seed and prime modulus, so the configuration and generation process has to repeat as many times as there are residues. For each prime modulus i and output value j the generator updates as follows:

$$rng\_val[i, j] = (rng\_val[i, j] + g\_val[i]) \bmod p\_val[i]$$

A block diagram of an implementation of a random number generator is shown in FIG. 7. Again the number of seed values (s_val) denoted the OUTPUT_SIZE.

Figure 8:
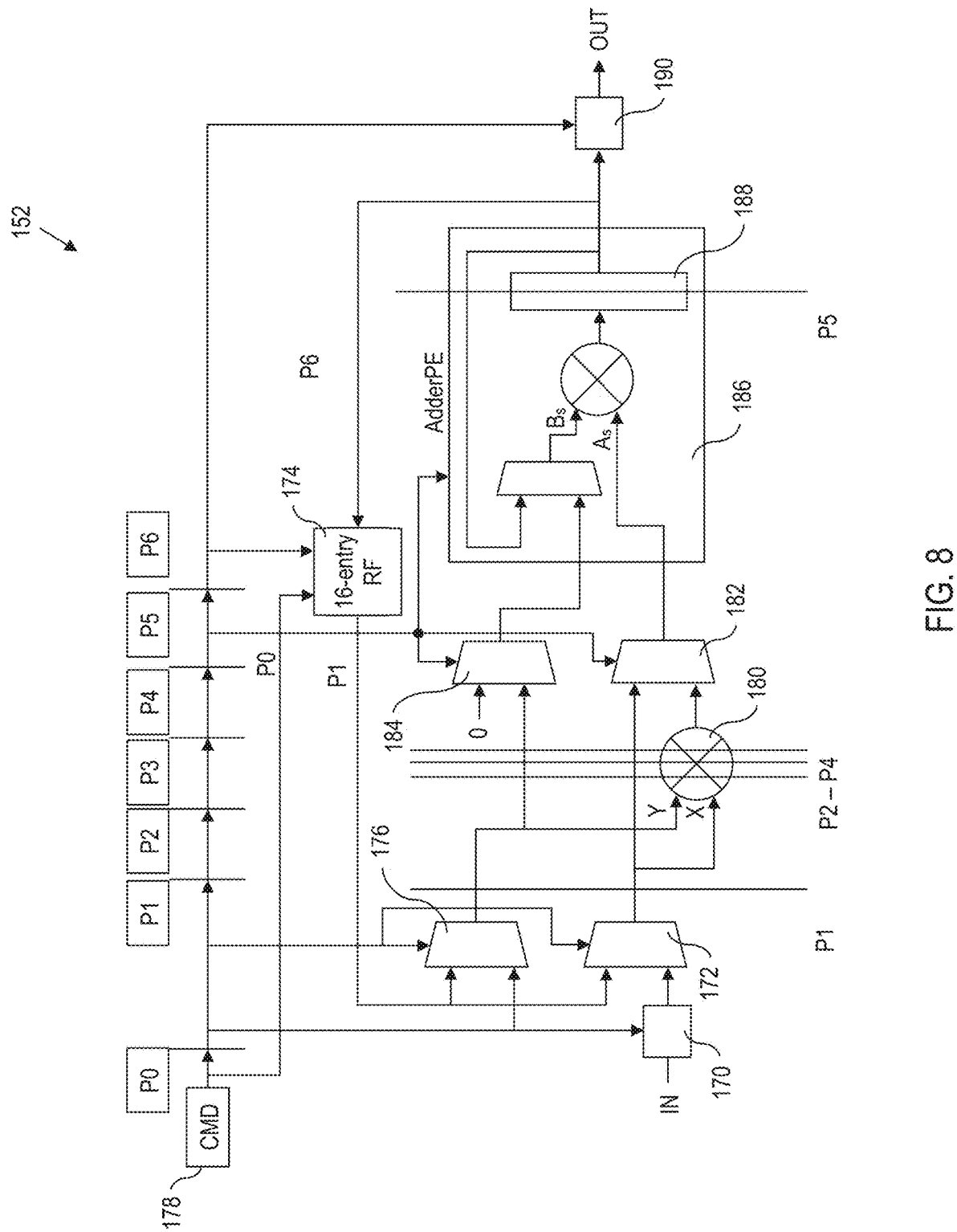
FIG. 8 is a block diagram illustrating a MAC PE unit including a pipeline, according to various aspects of the present disclosure.

Turning to FIG. 8, the Key-Switching operation in dedicated FHE accelerator is one of the most computationally expensive and frequent operations used. As such, a program sequence schedules these operations in such a way that they could take advantage of a custom-design Multiply-Accumulate unit enhanced with a local register file 174 so that sum-of-products (SOP) intermediate results can be stored locally and thus eliminated the need for writing them back in memory after each computation, which eliminates a need to fetch them again for the next sum.

The MAC PE 152 includes an input receiver 170 that goes to a multiplexer 172 that chooses between the input 170 or a register file 174. A second multiplexer 176 chooses between another input (CMD) 178 and the register file 174. The outputs of the two multiplexers 172, 276 feed a multiplier 180 (which can also be bypassed). The output of the multiplier 180 (which is shown as a three-stage pipelined multiplier in FIG. 5) feeds a third multiplexer 182 that chooses between the first multiplexer 172 and the multiplier 180. A fourth multiplexer 184 chooses between 0 and the second multiplexer 176. Then, the outputs of the third and fourth multiplexers 182, 184 feed an accumulator 186 that either accumulates (similar to conventional MAC functions) or is used as an adder (which may also be used for subtraction), depending on an operation selected. An output of the accumulator feeds a register 188, which in turn feeds the register file 174. Note that the command (i.e., operation) will dictate the select lines of the multiplexers 172, 176, 182, 184. The register 188 of the accumulator 186 also feeds an output 190 of the MAC PE. Each pipeline stage is represented by P0-P6. The vertical lines P1-P6 indicate where in the MAC PE the pipeline stage is located.

In some embodiments, a base extension commonly used in key-switching, involves the register file 174 inside the MAC PE to enable local data reuse in tight arithmetic loop operations. The size of the register file is tailored to the loop size that is common in fast-base extension operations found in FHE key-switching algorithms.

For example, an inner loop of the key switching algorithm (also referred to as the "fast base extension" subroutine) involves pre-computing a table of about twelve or so residue polynomials and then computing many (up to around forty) different weighted sums of those twelve values, with constant weights. Naive designs (i.e., current methods) would require twelve multiplications to compute the table, plus four-hundred-eighty multiplications and four-hundred-forty additions to compute the weighted sums, for a total of 1372 memory reads+932 memory writes=2304 memory accesses. With an accumulator and no local registers, it would require twelve multiplications for the table, plus four-hundred-eighty multiply-accumulate operations (of which forty need to write back to memory) for a total of 492 memory reads+52 memory writes=544 memory accesses.

However, the MAC PE is designed to be able to execute this algorithm with minimal memory traffic. Precomputing the table requires 12 memory reads, but the table itself can be stored entirely within the local register file. Computing each weighted sum requires twelve multiply-accumulate operations and no memory reads-all operands are either local registers or immediates. Further, only one memory write is required to save the result of each weighted sum. In total, the routine takes twelve memory reads and forty writes which equals fifty-two memory accesses in total. This is a forty-four times reduction compared to the naive design or a ten times reduction compared to the accumulator-only design.

The structure of the MAC PE described above supports modulo arithmetic operations (ring-based arithmetic operations), because both the multiplier 180 and adder 186 include modular reduction functionality. Thus, the output of the MAC PE is already reduced to be an element of the ring. For example, the multiplier used in the MAC PE calculates:

$$Product = (a * b) \bmod n.$$

Such a process requires three multiplications, one addition, one comparison and one subtraction. Similarly the adder is designed to calculate:

$$Sum = (a + b) \bmod n$$

Such a summing requires one addition, one comparison and one subtraction. Thus, one MAC operation in the MAC PE could perform nine operations that would be necessary in a traditional compute platform that operates on integer operations or typical processor. This nine-to-one operation reduces a number of memory accesses required.

The MAC unit design achieves not just a reduction in absolute memory traffic, it also reduces a total execution time of operations, as well as a percentage of cycles that require memory accesses. The base extension routine in the naive design would do 2304 memory accesses over 2304 elapsed cycles, using 100% of the memory bandwidth over that time. The accumulator-only design would do 544 memory accesses in 544 cycles, again using 100% of available memory bandwidth. With a register file, the routine does 52 memory accesses over 492 cycles, which is only 10.6% of the available memory bandwidth. The other 89.4% remains available for performing other operations in parallel, such as computing NTTs and transferring data to and from off-chip memory. As FHE processing systems are constrained by an amount of data that can be fetched and written back into memory, the memory traffic reduction that the MAC unit provides has a direct impact on the overall performance of the system.

The different PEs of the system herein allow the system to be scalable. For example, the PEs may be repeated thousands of times to scale the device. As another example, many devices (100, FIG. 1) may be added to the system to upscale the system.

As will be appreciated by one skilled in the art, aspects of the present disclosure may be embodied as a system, method or computer program product. Accordingly, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A method for reducing calculation time for processing fully homomorphic encrypted (FHE) data, the method comprising:

receiving FHE data;

determining, after receiving the FHE data, a first half of a key-switching key by randomly generating the first half of the key-switching key, comprising:

configuring a random number generator in a first mode; and generating the first half of the key-switching key in a second mode, comprising repeating until the first half of the key-switching key is complete:

generating data, using a same seed value, prime value, and generator value;

producing a residue of the key-switching key based on the generated data; and loading a new seed value, prime value, and generator value, so a subsequent residue of the first half of the key-switching key is generated from different seed values, prime values, and generator values;

acquiring a second half of the key-switching key;

constructing the key-switching key by appending the second half of the key-switching key to the first half of the key-switching key; and performing a key-switching operation on the FHE data using the key-switching key.

2. The method of claim 1, wherein determining the first half of the key-switching key by randomly generating the first half of the key-switching key further comprises:

randomly generating the first halves of several key-switching keys using uniform distribution over a finite field.

3. The method of claim 1, wherein determining the first half of the key-switching is performed using a programmable seed.

4. The method of claim 1, wherein determining the first half of the key-switching key is performed using a modulus parameter.

5. The method of claim 1, wherein seed values are equally spaced throughout a generation period.

6. The method of claim 1, wherein generating the first half of the key-switching key in the second mode is performed using a number of seed values equal to an output size of the random number generator.

7. The method of claim 1, wherein acquiring the second half of the key-switching key comprises:

pre-calculating the second half of the key-switching key before receiving the FHE data;

storing the second half of the key-switching key in memory; and retrieving the second half of the key-switching key from the memory.

8. The method of claim 1, wherein acquiring the second half of the key-switching key comprises:

determining, after receiving the FHE data, the second half of the key-switching key by generating the second half of the key-switching key based on the first half of the key-switching key.

* * * * *